(12) United States Patent
Dahlman et al.

(10) Patent No.: US 8,377,235 B2
(45) Date of Patent: Feb. 19, 2013

(54) PROCESS FOR FORMING STEEL

(75) Inventors: Patrick Dahlman, Patrille (SE); Martin Friis, Göteborg (SE); Henrik Karlsson, Göteborg (SE)

(73) Assignee: Aktiebolaget SKF, Göteborg (SE)

( * ) Notice: Subject to any disclaimer, the term of this patent is extended or adjusted under 35 U.S.C. 154(b) by 341 days.

(21) Appl. No.: 12/743,141

(22) PCT Filed: Nov. 6, 2008

(86) PCT No.: PCT/SE2008/000633
§ 371 (c)(1),
(2), (4) Date: Sep. 16, 2010

(87) PCT Pub. No.: WO2009/064234
PCT Pub. Date: May 22, 2009

(65) Prior Publication Data
US 2011/0000584 A1    Jan. 6, 2011

(30) Foreign Application Priority Data
Nov. 14, 2007 (SE) .................... 0702509-1

(51) Int. Cl.
*C23C 8/00* (2006.01)
*C21D 8/00* (2006.01)

(52) U.S. Cl. .......... 148/226; 148/546; 148/547
(58) Field of Classification Search .......... 148/226, 148/545, 546, 547
See application file for complete search history.

(56) References Cited

U.S. PATENT DOCUMENTS

| | | |
|---|---|---|
| 6,079,477 A | 6/2000 | Woodhouse |
| 2003/0102103 A1 | 6/2003 | Lombard et al. |
| 2004/0238150 A1 | 12/2004 | Adachi et al. |

FOREIGN PATENT DOCUMENTS

| | | |
|---|---|---|
| EP | 0701002 A1 | 3/1996 |
| WO | WO9803686 A1 | 1/1998 |

*Primary Examiner* — Jessee R. Roe
(74) *Attorney, Agent, or Firm* — Mark A. Ussai; Bryan Peckjian

(57) ABSTRACT

The invention refers to a process for forming a steel component, incorporating the steps of—providing a blank having substantially the volume of the component to be formed,—heating the blank to a semi solid state with a specific liquid fraction,—forming the blank with a forging technique to a component of near net shape dimensions,—subjecting the formed, near net shape component, to a normalization combined with a hardening,—subjecting the normalized and hardened near net shape component to machining to give the component net shape.

15 Claims, No Drawings

PROCESS FOR FORMING STEEL

BACKGROUND OF THE INVENTION

Forming of complex shaped steel parts is associated with working at high temperature in multi station presses. The material requires heating, shearing and forming with aid of a very large and expensive forging equipment. In order to give cost efficiency such methods require high production volumes and as few resetting operations as possible. The hot forged products have a poor accuracy and require a lot of machining after the forging process for obtaining the desired final shape. To enable machining, it is in many cases needed a soft annealing operation. After soft machining of the product thus formed a heat treatment operation is needed for causing the product to reach the desired hardness. These earlier known processes can be described as expensive and they have low flexibility, which means long lead times.

Attempts of forming metallic components with use of a thixo-forming process, i.e. where the metal is heated to a semi-solid state, before the forming step, have proven to give formed products with a material microstructure, which is so uneven, and a surface integrity, which is so poor, that the product is not useful for most purposes.

PURPOSE AND SUMMARY OF THE INVENTION

The purpose of the present invention is therefore now to propose a new forming process which results in products with a good micro-structure and surface integrity, and which gives reduced costs, a considerably increased flexibility and therefore extremely short lead times, and this has been achieved in that the process incorporates the steps defined in the accompanying claim 1.

It has surprisingly proven itself that such a result is obtained if a thixo forming process is directly combined with a tailored heat treatment operation, and the invention therefore means a combination of existing processes into a new combined process which can be used in a flexible production line.

DETAILED DESCRIPTION OF THE INVENTION

In a first step a raw material billet is heated into a semi-solid state and a specific liquid fraction. In the next step the semi-solid billet is formed in a thixo-forming process into a component having a near net shape. After reducing the component temperature, the component is homogenized to level out segregations. This process step is followed by annealing to accomplish a spheroidization of the micro structure. The component then is hardened either by furnace full hardening or by induction hardening.

At this point the component has obtained a nearly finished shape and a proper microstructure and surface integrity and thus the required material properties.

Finally the component is subjected to hard machining to net shape.

It is possible to use an alternative heat treatment operation, i.e. a controlled cooling cycle after thixo forming with a subsequent surface hardening.

For carbon steels in general it is possible to use a multi step homogenization, annealing and hardening.

By combining the processes into an optimized production line it is obtained a minimized volume of raw material waste as the size of the initial billet can be optimized mainly to correspond to the required amount of material for a near net shape product, even for very complex geometries, and consequently the hard machining required is also minimized.

A production line of this type is highly flexible depending on the individual sub-processes performed. It is possible to change billet size and to have thixo forming tools of different shapes and sizes.

The heat treatment can easily be varied in accordance with different shapes and sizes and with reference to different requirement regarding material properties. The hard machining step can further be modified for giving variations in shape and surface quality.

Lead times from order to delivery of a product will be shortened depending on the production flexibility.

The products produced will have nearly the same material properties as those achieved from standard forming operations.

Materials which can be worked in accordance with the process are steels of high, medium or low carbon content, and also different steel alloys.

For high carbon steels the thixo forming as an example can be can be performed at temperatures of about 1200 to 1500° C. In general the liquid fraction should be kept at 10 to 30%. After the thixo forming the sample is subjected to homogenization to level out segregations, by being held in an oven for at least 3 hours in the austenite region for the material in question, e.g. at about 1200° C. The specimen is then cooled in air. Thereafter spheroidization is carried out differently depending on the composition of the steel (under or over eutectoid steels, i.e. with a carbon content of below or above approximately 0.7% by weight).

For over eutectoid steels a speroidized structure is achieved by using a heat treatment cycle incorporating a heating step up to the austenite region (10-30° C. above $A_{cm}$-line), soaking for one hour, cooling to a temperature in the austenite+cementite region (20-30° C. above $A_1$-line, followed by cooling at a rate of approximately 10° C./hour to a temperature of 60-90° C. below the $A_1$-line. Finally the component is cooled to room temperature.

For having a speroidized structure of the under eutectoid steels the material shall be heated to a temperature of 10-50° C. below the $A_1$-line, soaking for 2-4 hours before cooling to room temperature. performed thereafter. Thereby the specimen is reheated to a temperature of 810-820° C. and maintained at that temperature up to one hour followed by cooling to 750° C. and then slow cooling to 650° C. at a rate of about 10° C./hour. Thereupon the specimen is cooled to room temperature.

The component then is hardened by full through hardening followed by cooling in oil at 60-80° C., in salt or gas, followed by tempering. Moreover hardening can also be performed by other methods, such as induction hardening and case hardening by carburization followed by tempering.

The invention is not limited to the exemplifying embodiments given hereabove, but modifications are possible within the scope of the accompanying claims.

The invention claimed is:
1. A process for forming a steel component comprising the steps of:
providing a blank having substantially the volume of the component to be formed,
heating the blank to a semi solid state having about a specific liquid fraction,
forming the blank with a forging technique into a component having approximate desired final dimensions,
subjecting the formed component to a normalization combined with a hardening, machining the normalized and hardened component to the desired final dimensions.

2. The process as claimed in claim 1, wherein the final machining step is performed as hard machining.

3. The process as claimed in claim 1, wherein the component is subjected to soft machining after normalization.

4. The process as claimed in claim 1, wherein the blank is cut from one of a tube, a bar and a wire.

5. The process as claimed in claim 1, wherein the heating of the blank to a semi solid state is performed via induction heating.

6. The process as claimed in claim 1, wherein the forming step is performed as a single forging stroke.

7. The process as claimed in claim 1, wherein the formed component is annealed so as to achieve spheroidization of the microstructure.

8. The process as claimed in claim 1, wherein the hardening is performed by induction hardening.

9. The process as claimed in claim 1, wherein the process is finished by spray quenching and tempering.

10. The process as claimed in claim 1, wherein the hardening is performed by case carburizing.

11. The process as claimed in claim 1, wherein the process is finished by tempering.

12. The process as claimed in claim 1 wherein the hardening process step is finished with quenching and tempering at a temperature within the range of about 150° C. and about 180° C. for between about one hour and about two hours.

13. The process as claimed in claim 12, wherein the quenching step is performed in oil having a temperature within the range of about 60° C. and about 80° C.

14. The process as claimed in claim 12, wherein the quenching step is performed in one of salt and gas.

15. A process for forming a steel component comprising the steps of:
   providing a blank having a volume of about a desired final volume of the component,
   heating the blank to a semi solid state having about a specific liquid fraction,
   forging the heated blank into an intermediate component having dimensions approximate to desired final dimensions of the component,
   heating the formed intermediate component to homogenize material structure;
   hardening the homogenized intermediate component; and
   machining the hardened component to the desired final dimensions.

* * * * *